July 27, 1926.  1,594,002
F. G. BREYER ET AL
METHOD OF MAKING ZINC SULPHIDE
Filed April 7, 1925
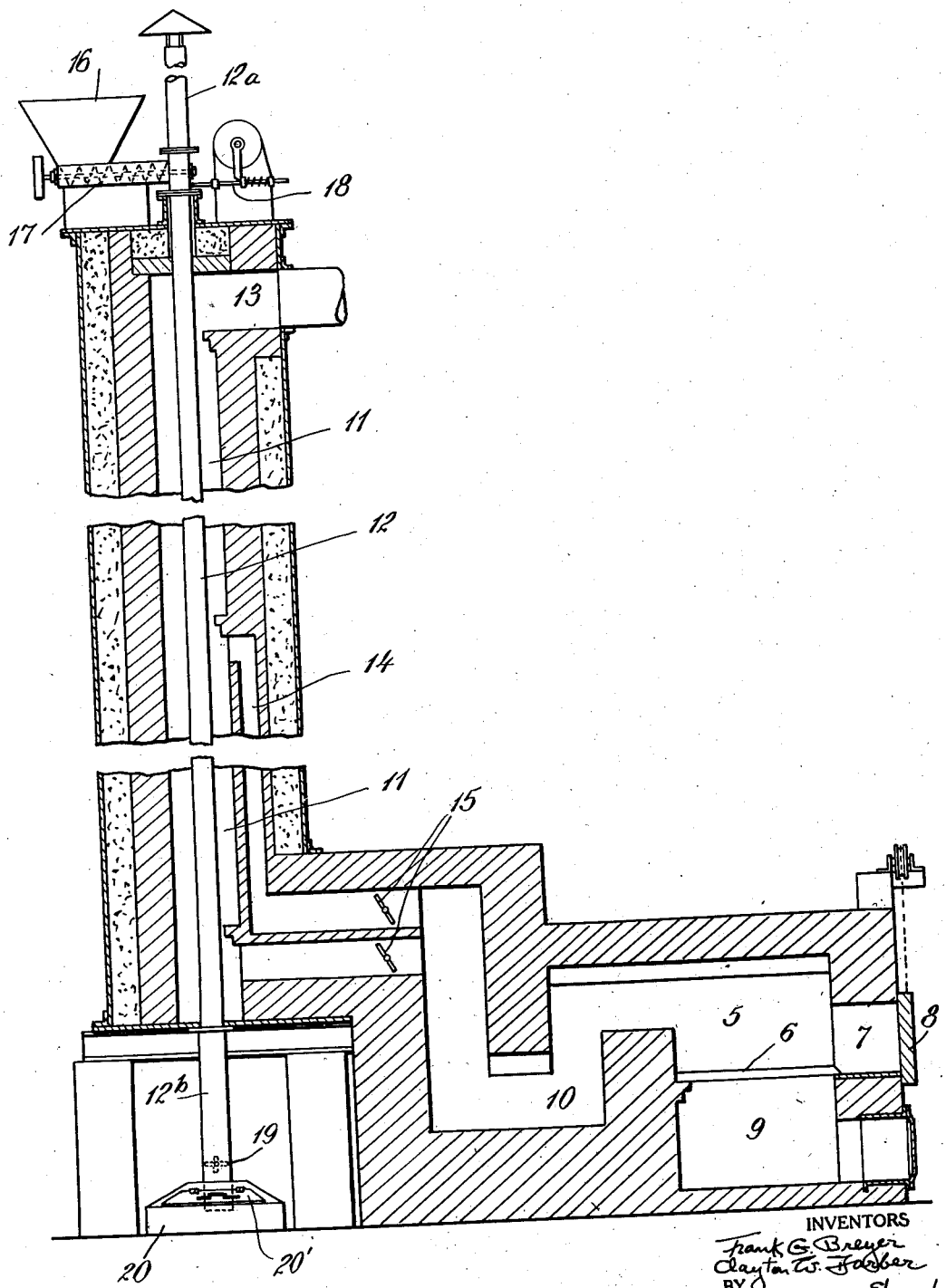
INVENTORS
Frank G. Breyer
Clayton W. Faber
BY
Pennie, Davis, Marvin & Edmonds
ATTORNEYS Patented July 27, 1926.

1,594,002

UNITED STATES PATENT OFFICE.

FRANK G. BREYER, OF PALMERTON, AND CLAYTON W. FARBER, OF BOWMANSTOWN, PENNSYLVANIA, ASSIGNORS TO THE NEW JERSEY ZINC COMPANY, OF NEW YORK, N. Y., A CORPORATION OF NEW JERSEY.

METHOD OF MAKING ZINC SULPHIDE.

Application filed April 7, 1925. Serial No. 21,277.

This invention relates to zinc sulphide pigment and has for its object the provision of an improved method of making zinc sulphide in the form of a pigment. When a mixture of zinc oxide pigment and sulphur is heated under non-oxidizing conditions, as for example in a closed vessel, to a temperature in excess of about 400° C., a reaction readily takes place between the zinc oxide and sulphur resulting in the formation of zinc sulphide of appropriate physical characteristics for use as a pigment. The chemical reaction may be represented by the following equation:

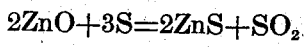
$$2ZnO + 3S = 2ZnS + SO_2$$

The reaction between the zinc oxide pigment and sulphur begins at a temperature slightly above 100° C. The reaction velocity increases with rise in temperature becoming extremely active at temperatures of 300–400° C., although not sufficiently rapid to effect complete conversion of the zinc oxide to zinc sulphide in a mixture containing approximately the calculated theoretical proportion of zinc oxide and sulphur. This appears to be due in part to loss of sulphur by volatilization from the charge, the vapor tension of sulphur being high at these temperatures so that considerable sulphur vapor is carried away with the sulphur dioxide gas resulting from the reaction. This deficiency of sulphur in the charge as a consequence of volatilization may be overcome by using an appropriate excess of sulphur in the mixture. Practically complete conversion of the zinc oxide pigment to zinc sulphide pigment can be accomplished at a temperature of 450° C. with a mixture containing 25% more than the calculated proportion of sulphur and a zinc oxide pigment of relatively small particle size. Increase of the temperature to 600° C. and higher correspondingly increases the reaction velocity and gives more consistently high conversion of zinc oxide to zinc sulphide.

The fineness of particle subdivision of the zinc oxide pigment exercises a marked influence on the rapidity with which the reaction proceeds and its degree of completeness. Thus, with the usual grades of American or French process zinc oxide, whose average particle size is approximately 0.4–0.5 micron, the reaction proceeds relatively much slower than with zinc oxide of an average particle size of 0.25 micron, or less, such as described in the United States patent of Breyer, Gaskill and Singmaster, No. 1,522,098, patented January 6, 1925. With reaction temperatures of from 600° C.–800° C., rapid and efficient conversion of the zinc oxide pigment to zinc sulphide pigment is effected when using zinc oxide pigment of an average particle size of 0.25 micron or less.

If a zinc sulphide pigment product is desired having the maximum possible whiteness and brightness, it is essential that only extremely pure zinc oxide and sulphur be used. The most satisfactory zinc oxide pigment in this respect is that made from high grade slab zinc. Similarly, resublimed flowers of sulphur should be used. The zinc sulphide pigment made from less pure zinc oxide and sulphur is usually deficient in color and brightness. If these properties of color and brightness are not of the first importance, lower grade raw materials may be used.

The zinc sulphide pigment obtained by heating a mixture of zinc oxide pigment and sulphur, in the manner hereinbefore described, is a yellowish white powder, having no visible crystalline character, even when examined under the highest magnification with the microscope. It has good pigment properties when rubbed down in oil but its color is more yellow than the better grades of white pigments.

Our present invention involves an improved method of carrying out the heat treatment of a mixture of zinc oxide pigment and sulphur for the production of a pigment composed for the most part of zinc sulphide. In accordance with the present invention, the mixture of zinc oxide pigment and sulphur is progressively passed through an upright reaction chamber and while passing through the chamber is subjected to a sufficiently high temperature to effect the ready formation of zinc sulphide. The reaction chamber is preferably an upright or vertically disposed retort externally heated to a temperature of approximately 600–800° C. The charge, consisting initially of the mixture of zinc oxide pigment and sulphur, substantially fills the upright reaction chamber or retort and passes by gravity therethrough. The resulting product is progressively discharged from the bottom of the chamber or retort and is cooled under conditions inhibiting any appreciable oxidation of the zinc sulphide therein.

In accordance with our preferred practice, the upright chamber or retort is operated so as to subject the charge progressively passing therethrough to a two-stage heat-treatment operation in the first stage of which substantially complete conversion of zinc oxide to zinc sulphide is effected and in the second stage of which an improvement in the color of the zinc sulphide is attained. The mixture of zinc oxide pigment and sulphur is charged into the top of the upright chamber or retort and progresses downwardly therethrough as fast as the finished product is withdrawn from the bottom. The mixture first passes through a heated zone where the temperature is rapidly raised to a point at which the reaction between the zinc oxide and sulphur readily proceeds. Below this reaction zone, the charge (now crude zinc sulphide) passes into a second heated zone in which the temperature may be controlled independently of the temperature in the reaction zone. In this second heated zone the charge is subjected to a temperature usually slightly lower than the temperature in the reaction zone, and as a result of this heat treatment an improvement in the color of the product is attained. The second heated zone is preferably followed by a cooling zone through which the charge progresses and from which the finished product is withdrawn in any appropriate manner. Care should be taken to cool the finished product to a temperature below that at which oxidation of zinc sulphide takes place (about 400–450° C.) under non-oxidizing conditions.

In the single figure of the accompanying drawing, we have illustrated an apparatus particularly adapted for carrying out the present invention.

The apparatus illustrated in the drawing comprises a fire box 5 having a grate 6, a firing door 7 with a counter-weighted closure 8 therefor, and ash-pit 9. A flue 10 conducts the gaseous products of combustion from the fire box to the retort or muffle chamber 11. An upright or vertically disposed retort or muffle 12 is mounted within the chamber 11. Where the apparatus is to carry out the aforementioned two-stage heat-treatment operation the retort 12 may conveniently be a zinc-coated steel pipe about 9 inches in diameter and about 30 feet long.

The gaseous products of combustion from the burning fuel on the grate 6 pass through the flue 10 into the chamber 11 and surround the retort 12 and escape from the top of the chamber 11 through an opening 13 to an appropriate stack (not shown).

The furnace structure of the heating chamber 11 is provided with a flue 14 for conducting a portion of the heating gases from the fire box to a point about midway the ends of the chamber 11. A portion of the hot gases from the fire box thus enter the lower end of the chamber 11, while another portion of the fire gases enter the chamber 11 at about the middle thereof. Appropriate dampers 15 may be provided for proportioning the relative amounts of the fire gases admitted to the two points of the heating chamber 11.

The retort 12 is provided at its upper end with an extension 12$^a$. The mixed zinc oxide and sulphur is charged into the lower end of the extension 12$^a$ through a hopper 16 and a screw conveyor 17. The upper portion of the extension 12$^a$ serves as a stack for the escape of the gaseous products resulting from the interaction of the zinc oxide and sulphur. If desired, the extension 12$^a$ may be connected by suitable flues to a sulphuric acid plant for the recovery of the sulphur dioxide gas. A rapping mechanism 18 is provided for periodically striking the extension 12$^a$ and thereby preventing the bridging and hanging of the charge in the muffle tube or retort 12.

The lower end of the retort 12 communicates with an extension 12$^b$ exposed to the atmosphere below the furnace structure of the muffle chamber. The extension 12$^b$ is provided with a mechanically actuated star wheel discharge 19. The extension 12$^b$ terminates at its lower end within a covered pan 20 where an effective seal is provided by the accumulation of the discharged sulphide in the pan. The cover of the pan 20 is provided with a hinged portion 20' permitting convenient access to the interior of the pan for leveling the material therein or for removing material therefrom.

The actual practice of the invention will be better understood from the following description representing what we now consider the preferred manner of carrying out the invention.

Zinc oxide (preferably of a particle size of about 0.25 micron or less and carrying less than 0.1% of combined lead, cadmium and iron oxides or other impurities which would yield dark-colored sulphides) is mixed with about three quarters of its weight of finely divided sulphur, preferably resublimed flowers of sulphur of high purity. This proportion includes an excess of 25% over the chemically equivalent proportion of sulphur to allow for volatilization losses. The proportions of zinc oxide and sulphur should be such as to supply sufficient excess of sulphur to compensate for volatilization losses.

The mixing of the zinc oxide and sulphur should be carried out in such a way as to avoid compacting of the charge. A satisfactory form of mixture is a rotary screen of the type used for bolting zinc oxide with a screen of about 14 meshes per lineal inch. Usually two passes through the screen are advisable to secure a reasonably uniform mixture.

Failure to provide a sufficient excess of sulphur or to avoid compacting of the charge during mixing of the zinc oxide and sulphur may result in low conversion of the zinc oxide to zinc sulphide.

The mixed zinc oxide and sulphur is charged into the hopper 16 which normally is kept substantially full. The screw conveyor 17 carries the mixture from the lower end of the hopper into the retort extension 12$^a$. Under normal operating conditions, the retort 12 and its extension 12$^a$ (below the screw conveyor 17) is substantially filled with the charge. The charge progresses by gravity downwardly through the retort 12 as fast as the finished product is withdrawn from the bottom of the retort. To avoid danger of bridging and hanging of the charge in the retort, the rapping mechanism 18 periodically strikes the retort or its extension, thus jarring the retort sufficiently to keep the charge freely moving.

The retort 12 is heated to a temperature of about 600–800° C. by the hot gases from the burning fuel in the fire box. The upper half of the retort 12 serves as a reaction chamber in which the conversion of zinc oxide to zinc sulphide takes place. We have secured excellent results by bringing the charge in this portion of the retort to a temperature of about 700–725° C. Substantially complete conversion of the zinc oxide to zinc sulphide takes place in this portion of the retort. The lower half of the retort 12 serves as the second stage heat treatment chamber where the crude zinc sulphide product is subjected to a heat treatment operation as a consequence of which the color of the zinc sulphide is improved. The temperature of the charge in the lower half of the retort 12 may be slightly less than in the upper half, and we have secured excellent results with a temperature of about 675–700° C. in the lower half of the retort 12.

The sulphur dioxide gas evolved by the reaction between the zinc oxide and sulphur provides a non-oxidizing atmosphere in the retort 12, and furthermore maintains within the retort a gaseous pressure sufficiently greater than the atmospheric pressure to effectually prevent entrance of air into the retort. The evolution of sulphur dioxide gas is of course greatest in the upper portion of the retort, but sufficient gas is evolved even in the lower portion of the retort to provide a gaseous pressure slightly greater than the atmospheric pressure. Moreover, the lower end is preferably sealed by the accumulation of the discharged product in the pan 12 so that the entrance of air into the lower end of the retort is effectively guarded against.

The star wheel discharge 19 comprises a rotatably mounted star wheel having four blades or wings. The shaft of the star wheel is given a quarter turn at predetermined intervals, preferably by an automatic mechanical mechanism of any appropriate type. Each time the star wheel is turned through a quarter revolution a definite amount of the zinc sulphide product is discharged from the retort into the pan 20. The product in the pan 20 is leveled from time to time to prevent clogging or filling up of the lower end of the extension 12$^b$. When sufficiently full, the pan 20 may be replaced by an empty pan, or the zinc sulphide product in the pan may be removed through the door 20', care being taken to avoid exposure of the product to air while at a temperature above the oxidation temperature of zinc sulphide, which is in the neighborhood of 400–450° C.

The charge of mixed zinc oxide and sulphur should be heated rapidly to a temperature that will insure complete reaction before volatilization losses have reduced the amount of available sulphur below that chemically equivalent to the zinc oxide to be converted. The temperature should be maintained at the reaction point (in the first stage) only long enough to insure complete conversion of the zinc oxide to zinc sulphide, and (in the second stage) only long enough to bring about the desired improvement in the color of the zinc sulphide. Continuation of the heating might result in reoxidation of the zinc sulphide, particularly if any air or other oxidizing influences are present.

Excessive temperatures should be avoided as they result in a light sintering together of the particles and the growth of large particles at the expense of small particles. Excessive temperatures also result in the early destruction of the retort and contamination of the zinc sulphide product by scale, iron sulphide, etc. Control of the temperature and of the time of heating permits the control of the particle size of the final zinc sulphide pigment. A short time of heating and low temperature yields fine particle size material, while a long time of heating and high temperature causes the growth of particles and the sintering together of particles and hence a relatively coarse final product.

The subsequent treatment of the zinc sulphide product collected in the pan 20 depends to some extent upon the use to which the zinc sulphide pigment is to be put. The product may, for example, be first screened and then subjected to dry disintegration. Ordinarily, it is our preferred practice to wet grind the zinc sulphide product in a pebble mill to break up aggregates. The ground product is then filtered, dried and disintegrated.

The zinc sulphide pigment obtained by the foregoing procedure (using zinc oxide of an average particle size of 0.25 micron or less as a base) is a white powder having no visible crystalline character even when examined under the highest magnification with the microscope. Its ultimate particles have an average diameter of the order of 0.5 micron. It has strong pigment properties when rubbed down in oil, such as fineness, freedom from grit, and high hiding power or strength. In whiteness and brightness, it is comparable with the best white pigments available. The pigment is essentially pure zinc sulphide containing usually less than 1% of free zinc oxide, and when made from substantially pure starting materials contains only a few hundredths of one per cent of lead and iron.

While we have hereinbefore particularly described the operation of the apparatus illustrated in the accompanying drawing for carrying out a two-stage heat treatment operation, it is to be understood that in some cases the second stage may be dispensed with. The second stage heat treatment operation improves the color of the zinc sulphide pigment. Where maximum whiteness and brightness are not required, the charge may be retained in the upright retort for only that period of time necessary to complete the conversion of zinc oxide to zinc sulphide.

We claim:

1. The method of making a pigment composed for the most part of zinc sulphide which comprises progressively passing a mixture of zinc oxide pigment and sulphur through an upright reaction chamber, and subjecting the mixture while passing through the chamber to a sufficiently high temperature to effect the ready formation of zinc sulphide.

2. The method of making a pigment composed for the most part of zinc sulphide which comprises progressively passing a mixture of zinc oxide pigment and sulphur through a heated upright retort, and subjecting the mixture while passing through the retort to a temperature of 600–800° C.

3. The method of making a pigment composed for the most part of zinc sulphide which comprises progressively passing a mixture of zinc oxide pigment of an average particle size not exceeding about 0.25 micron and sulphur through an upright reaction chamber, and subjecting the mixture while passing through the chamber to a sufficiently high temperature to effect the ready formation of zinc sulphide.

4. The method of making a pigment composed for the most part of zinc sulphide which comprises progressively passing a mixture of zinc oxide pigment of an average particle size not exceeding about 0.25 micron and sulphur through a heated upright retort, subjecting the mixture while passing through the retort to a temperature of 600–800° C, and cooling the resulting product under conditions inhibiting any appreciable oxidation of the zinc sulphide therein.

5. The method of making a pigment composed for the most part of zinc sulphide which comprises progressively passing a mixture of zinc oxide pigment and sulphur by gravity through a heated upright chamber in which a non-oxidizing atmosphere of slightly greater pressure than atmospheric pressure is maintained by the gases evolved as a result of the reaction between the zinc oxide and sulphur, and cooling the resulting product under conditions inhibiting any appreciable oxidation of the zinc sulphide therein.

6. The method of making a pigment composed for the most part of zinc sulphide which comprises progressively passing a mixture of zinc oxide pigment and sulphur by gravity through a heated upright chamber in which a non-oxidizing atmosphere of slightly greater pressure than atmospheric pressure is maintained by the gases evolved as a result of the reaction between the zinc oxide and sulphur, progressively discharging the resulting product from the bottom of the chamber, sealing the chamber at the bottom against the entrance of air, and cooling the resulting product under conditions inhibiting any appreciable oxidation of the zinc sulphide therein.

7. The method of making a pigment composed for the most part of zinc sulphide which comprises progressively passing a mixture of zinc oxide pigment and sulphur through an upright reaction chamber, and subjecting the mixture while passing through the chamber to a two-stage heat treatment operation in the first stage of which substantially complete conversion of zinc oxide to zinc sulphide is effected and in the second stage of which an improvement in the color of the zinc sulphide is attained.

8. The method of making a pigment composed for the most part of zinc sulphide which comprises progressively passing a mixture of zinc oxide pigment and sulphur through an upright reaction chamber, subjecting the mixture while passing through the chamber to a two-stage heat treatment operation under non-oxidizing conditions and at a temperature of 600–800° C., substantially complete conversion of zinc oxide to zinc sulphide being effected in the first stage of said operation and an improvement in the color of the zinc sulphide being attained in the second stage, and cooling the resulting product under conditions inhibiting any appreciable oxidation of the zinc sulphide therein.

9. The method of making a pigment composed for the most part of zinc sulphide which comprises progressively passing a mixture of zinc oxide pigment of an average particle size not exceeding about 0.25 micron and sulphur through an upright reaction chamber, subjecting the mixture while passing through the chamber to a two-stage heat-treatment operation in the first stage of which substantially complete conversion of zinc oxide to zinc sulphide is effected and in the second stage of which an improvement in the color of the zinc sulphide is attained, and cooling the resulting product under conditions inhibiting any appreciable oxidation of the zinc sulphide therein.

10. The method of making a pigment composed for the most part of zinc sulphide which comprises progressively passing a mixture of zinc oxide pigment of an average particle size not exceeding about 0.25 micron and sulphur through an upright reaction chamber, subjecting the mixture while passing through the chamber to a two-stage heat treatment operation under non-oxidizing conditions and at a temperature of 600–800° C., substantially complete conversion of zinc oxide to zinc sulphide being effected in the first stage of said operation and an improvement in the color of the zinc sulphide being attained in the second stage, and cooling the resulting product under conditions inhibiting any appreciable oxidation of the zinc sulphide therein.

11. The method of making a pigment composed for the most part of zinc sulphide which comprises progressively passing a mixture of zinc oxide pigment and sulphur by gravity through an upright chamber heated to a temperature of 600–800°C. and in which a non-oxidizing atmosphere is maintained by the gases evolved as a result of the reaction between the zinc oxide and sulphur, and cooling the resulting product under conditions inhibiting any appreciable oxidation of the zinc sulphide therein.

12. The method of making a pigment composed for the most part of zinc sulphide which comprises progressively passing a mixture of zinc oxide pigment of an average particle size not exceeding about 0.25 micron and sulphur through an upright chamber heated to a temperature of 600–800° C. and in which a non-oxidizing atmosphere is maintained by the gases evolved as a result of the reaction between the zinc oxide and sulphur, progressively discharging the resulting product from the bottom of the chamber, and cooling the resulting product under conditions inhibiting any appreciable oxidation of the zinc sulphide therein.

In testimony whereof we affix our signatures.

FRANK G. BREYER.
CLAYTON W. FARBER.